United States Patent

Verellen et al.

[11] Patent Number: 5,882,084
[45] Date of Patent: Mar. 16, 1999

[54] TILT LOCKING SEAT BELT RETRACTOR

[75] Inventors: Lawrence J. Verellen, Washington; Gene L. Scofield, Warren; Chhay S. Siev, Dryden, all of Mich.

[73] Assignee: TRW Vehicle Safety Systems Inc., Lyndhurst, Ohio

[21] Appl. No.: 957,795

[22] Filed: Oct. 24, 1997

[51] Int. Cl.⁶ .................................................. A47C 31/00
[52] U.S. Cl. ........................ 297/478; 297/483; 242/384.4
[58] Field of Search .............. 242/384.4, 384.5, 242/384.6; 297/483, 478, 476, 475, 479, 480

[56] References Cited

U.S. PATENT DOCUMENTS

| 4,164,337 | 8/1979 | Blom | 297/478 X |
|---|---|---|---|
| 4,343,444 | 8/1982 | Francis | 242/384.4 |
| 4,556,177 | 12/1985 | Kuwakado et al. | 242/384.4 |
| 4,610,480 | 9/1986 | Yamoda et al. | 297/478 |
| 5,495,994 | 3/1996 | Rumpf et al. | |
| 5,611,604 | 3/1997 | Thomas et al. | 297/478 |
| 5,660,444 | 8/1997 | Thomas | 297/478 |
| 5,716,102 | 2/1998 | Ray et al. | 297/478 |

FOREIGN PATENT DOCUMENTS 2360456  6/1974  Germany .............................. 297/478

*Primary Examiner*—Laurie K. Cranmer
*Attorney, Agent, or Firm*—Tarolli, Sundheim, Covell, Tummino & Szabo

[57] ABSTRACT

A seat belt retractor (10) for mounting on a vehicle seat back (22) includes a spool (110) on which seat belt webbing (32) is wound. The retractor (10) includes inertia sensing means (40) for blocking rotation of the spool (110) in a belt withdrawal direction (124) in response to vehicle deceleration above a predetermined deceleration. The inertia sensing means (40) comprises a first inertia member (222) movable from an unactuated position to an actuated position in response to vehicle deceleration above a predetermined deceleration, and sensor means (230) operable to block rotation of the spool (110) in the belt withdrawal direction (124) in response to movement of the first inertia member (222) from the unactuated position to the actuated position. The sensor means (230) is operable to block rotation of the spool (110) in the belt withdrawal direction (124) in response to tilting of the vehicle seat back (22) by an amount more than a predetermined amount when the first inertia member (222) is in the unactuated position.

12 Claims, 7 Drawing Sheets

TILT LOCKING SEAT BELT RETRACTOR

BACKGROUND OF THE INVENTION

1. Technical Field

The present invention relates to a vehicle seat belt retractor, and relates particularly to a seat back mounted retractor in which withdrawal of belt webbing is blocked in response to tilting of the seat back in excess of a predetermined amount.

2. Description of the Prior Art

A typical seat belt system used to restrain a vehicle occupant includes a length of belt webbing wound on a spool of a seat belt retractor. The belt webbing is extensible about a vehicle occupant to restrain the occupant. In the event of sudden deceleration such as occurs in a vehicle collision, a vehicle deceleration sensing assembly in the retractor is actuated to block withdrawal of the belt webbing from the retractor. If the retractor is mounted in a reclinable vehicle seat back, the sensing assembly should be operable when the seat back is tilted to different positions. U.S. Pat. No. 5,495,994 discloses one such type of vehicle deceleration sensing assembly.

A reclinable vehicle seat back has a nominal "installed position" as determined by the vehicle manufacturer. The installed position is a particular position to which the seat back may be reclined or tilted about the seat back adjustment axis, within the overall seat back adjustment range (forward and rearward tilting) of the seat back.

Some motor vehicle safety standards require that a seat back mounted retractor must automatically lock (prevent belt withdrawal) when the seat back is tilted forward or rearward to a position at least a certain number of degrees from the installed position. Such standards also specify that the retractor must not automatically lock when the seat back is tilted to a position within a smaller number of degrees from the installed position. For example, one standard specifies that a seat back mounted retractor must automatically lock when the seat back is tilted to a position more than 27 degrees from the installed position, but must not automatically lock when the seat back is tilted to a position 12 degrees or less from the installed position.

The retractor shown in U.S. Pat. No. 5,495,994 has an inertia sensing mechanism which includes a ball supported for rolling movement on a support member having a ramp surface. The support member is gimbaled so that it swings to maintain a predetermined upright orientation during tilting movement of the seat back. Upon sudden vehicle deceleration, the ball rolls up the ramp surface to push a lock lever into locking engagement with a ratchet. In order to achieve a tilt locking feature, a retractor constructed in accordance with U.S. Pat. No. 5,495,994 has stops which limit swinging movement of the support member upon substantial tilting of the seat back. After the seat back is tilted far enough that the ramp hits the stop, a further increment of tilting of the seat back causes the ball to roll far enough up the ramp to push the sensor lever into engagement with the ratchet and, thereby, lock the retractor and keep it locked. If the seat back is tilted to a position in which the support member engages the stop, but which is not tilted enough to actuate the tilt locking feature, the ball will roll to and stay in a position part way up the ramp surface, even when the vehicle is not experiencing sudden vehicle deceleration. When the ball is in this non-centered position, the inertia sensing mechanism is closer to a locking condition. Sudden car movements, such as can result from road shocks, which would not normally be large enough to actuate the inertia locking mechanism may, in fact, do so.

SUMMARY OF THE INVENTION

The present invention is a seat belt webbing retractor for mounting on a vehicle seat back and comprises a spool on which seat belt webbing is wound. The spool is supported for rotation about an axis in a belt retraction direction and in an opposite belt withdrawal direction. The retractor includes inertia sensing means for blocking rotation of the spool in the belt withdrawal direction in response to vehicle deceleration above a predetermined deceleration. The inertia sensing means comprises a first inertia member movable from an unactuated position to an actuated position in response to vehicle deceleration above a predetermined deceleration. The inertia sensing means also comprises sensor means operable to block rotation of the spool in the belt withdrawal direction in response to movement of the first inertia member from the unactuated position to the actuated position. The sensor means is also operable to block rotation of the spool in the belt withdrawal direction in response to tilting of the vehicle seat back by an amount more than a predetermined amount when the first inertia member is in the unactuated position.

BRIEF DESCRIPTION OF THE DRAWINGS

Further features of the present invention will become apparent to those skilled in the art to which the present invention relates from reading the following specification with reference to the accompanying drawings, in which.

DESCRIPTION OF A PREFERRED EMBODIMENT

Figure 1:
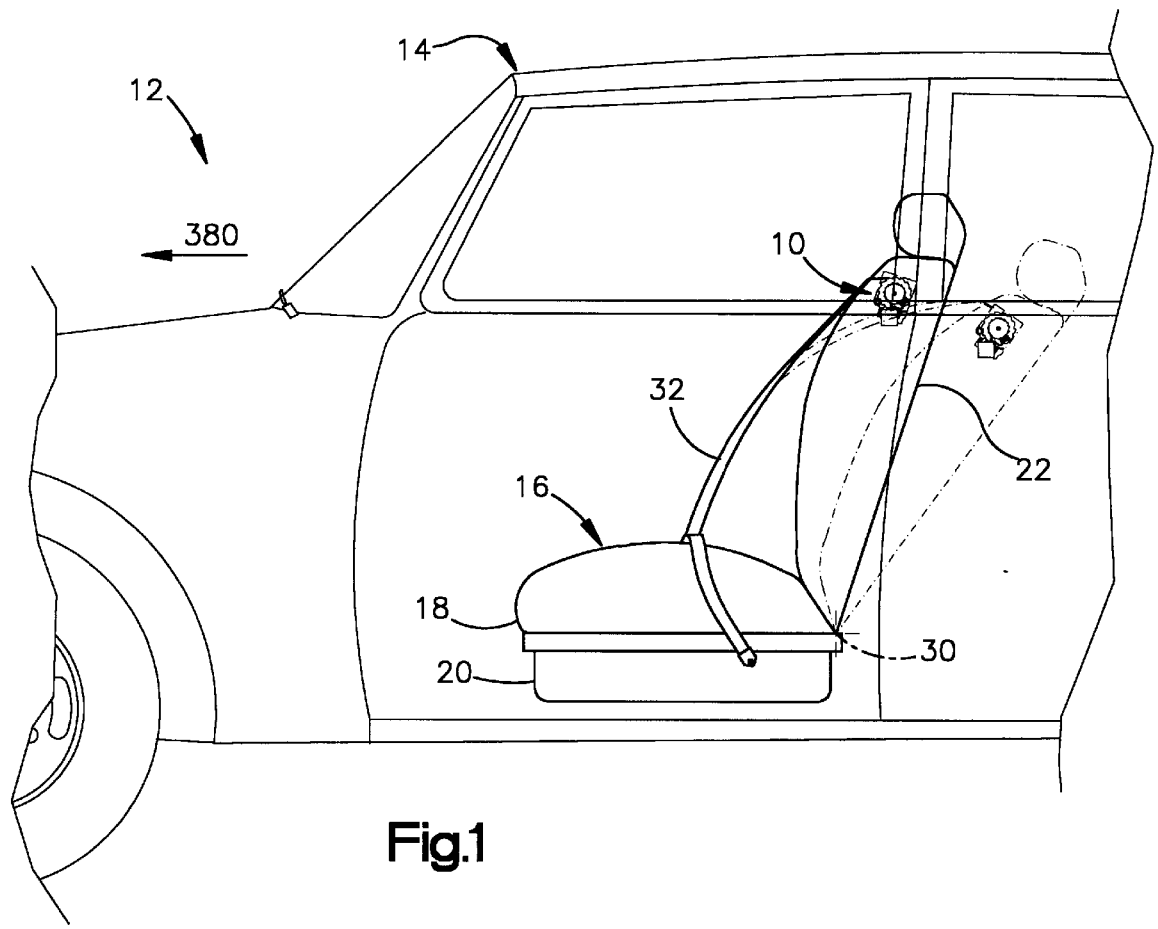
FIG. 1 is a schematic side elevational view illustrating a portion of a vehicle having a seat with a reclining seat back and a seat belt retractor mounted on the seat back and having a vehicle deceleration sensing assembly constructed in accordance with the present invention.

The present invention relates to a vehicle seat belt retractor and particularly to a seat back mounted retractor in which withdrawal of belt webbing is blocked in response to tilting of the seat back beyond a predetermined amount. The present invention is applicable to various retractor constructions. As representative of the present invention, FIG. 1 illustrates a seat belt retractor 10.

The retractor 10 is mounted in a vehicle 12 which includes a body 14. A seat 16 of the vehicle 12 includes a seat bottom cushion 18 mounted on a base 20. A seat back 22 is connected with the seat bottom cushion 18 and the seat base 20 for pivotal movement about a seat back adjustment axis 30 relative to the seat bottom cushion and to the base.

The retractor 10 is mounted in the seat back 22 in a suitable manner (not shown) such as by connection to a frame member of the seat back. A length of belt webbing 32 extends from the retractor 10 through a slot 34 (FIG. 1A) in the seat back 22. The belt webbing 32 is extensible around an occupant of the seat 16, in a known manner, to restrain the occupant in the event of sudden vehicle deceleration such as occurs in a vehicle collision.

Figure 1A:
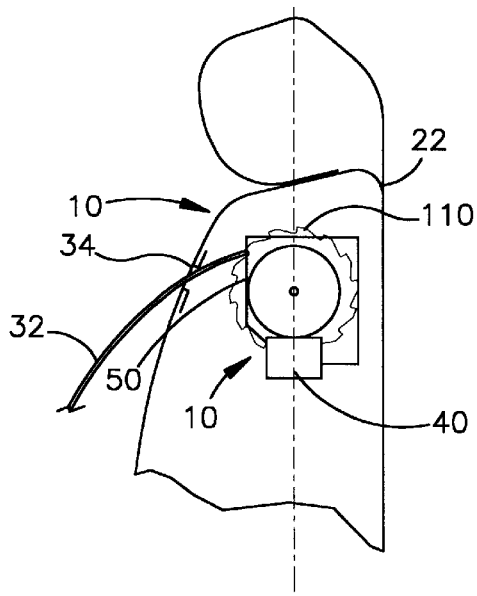
FIG. 1A is an enlarged view of a portion of the seat back of FIG. 1 shown in a vertical position.
Figure 1B:
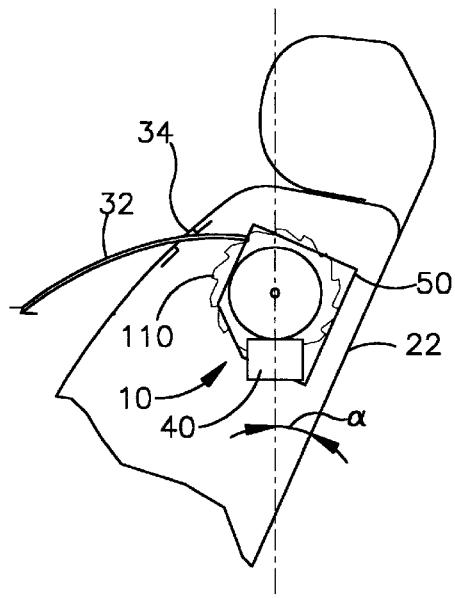
FIG. 1B is a view similar to FIG. 1A showing the seat back reclined at an angle.

As illustrated in FIGS. 1A and 1B, and as will be described below in more detail, the retractor 10 includes a vehicle deceleration sensing assembly 40. When the retractor 10 is in any one of a plurality of different inclined orientations, such as the vertical orientation shown in FIG. 1A and the reclined orientation shown in FIG. 1B (inclined at an angle $\alpha$), the sensing assembly 40 is actuatable to block withdrawal of belt webbing 32 from the retractor 10 in response to sudden vehicle deceleration such as occurs in a vehicle collision.

Figure 2:
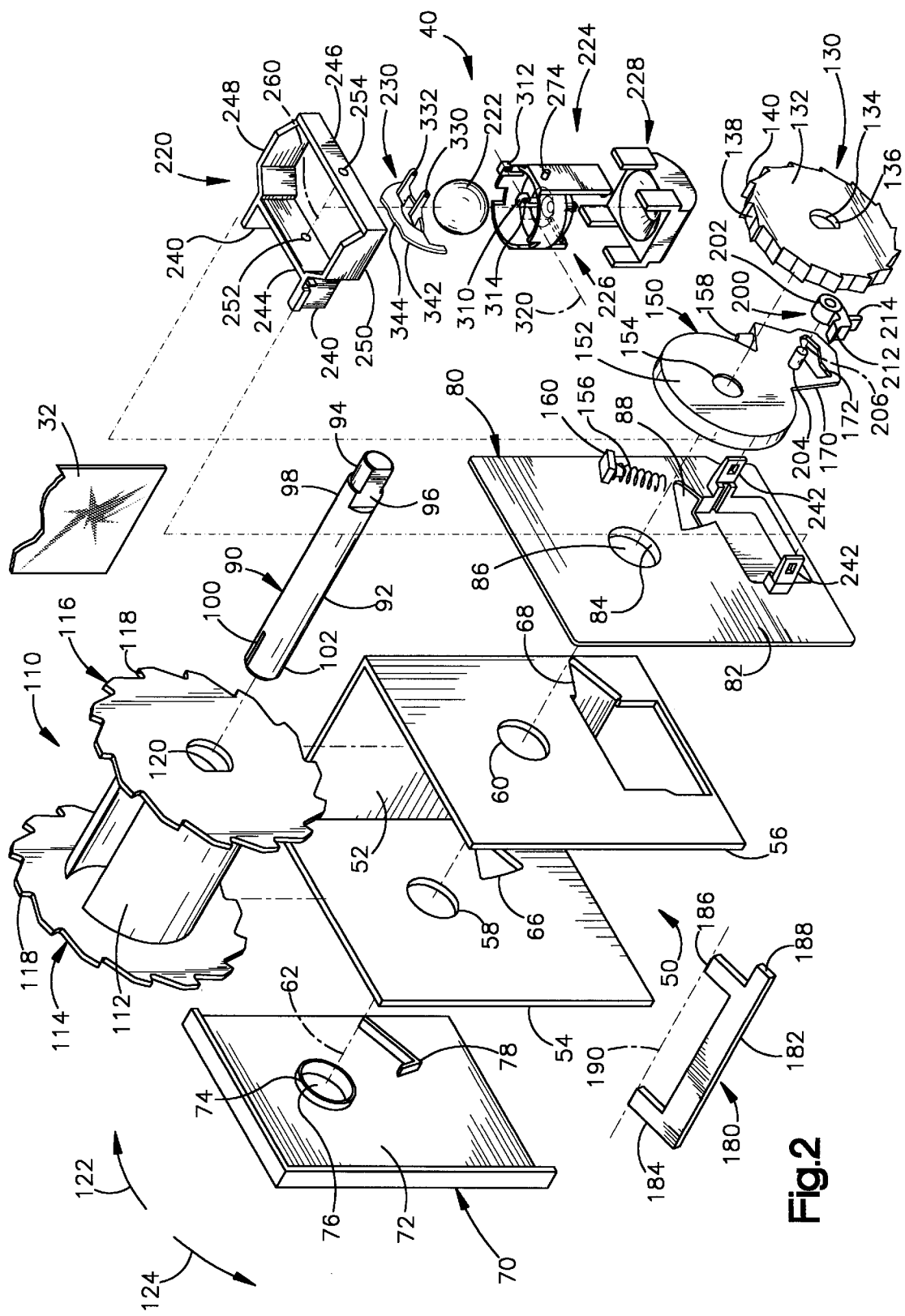
FIG. 2 is an exploded perspective view of the retractor of FIG. 1.

The retractor 10 (FIG. 2) includes a frame 50 which is fixed to the vehicle seat back 22 in a manner not shown. The frame 50 is a single piece of sheet metal stamped and formed to a U-shaped configuration as seen in FIG. 2. The frame 50 includes a back wall 52 and spaced parallel side walls 54 and 56 which extend generally perpendicular to the back wall.

A circular opening 58 is formed in one frame side wall 54. A circular opening 60 is formed in the other frame side wall 56. The centers of the circular openings 58 and 60 are disposed on a spool axis 62 of the retractor 10. The spool axis 62 extends between the frame side walls 54 and 56 in a direction parallel to the frame back wall 52. A wedge-shaped main lock pawl opening 66 in the frame side wall 54 is aligned with a wedge-shaped main lock pawl opening 68 in the frame side wall 56.

A plastic end plate 70 is fixed to the frame side wall 54. A planar wall portion 72 of the end plate 70 is disposed in abutting engagement with the frame side wall 54. An annular boss 74 on the end plate 70 is received in the circular opening 58 in the frame side wall 54. The boss 74 defines a circular opening 76 which extends axially through the end plate 70. A V-shaped projection 78 on the wall portion 72 of the end plate 70 is received in the main lock pawl opening 66 in the frame side wall 54.

A plastic bearing plate 80 is fixed to the other frame side wall 56. A planar wall portion 82 of the bearing plate 80 is disposed in abutting engagement with the frame side wall 56. An annular boss 84 on the bearing plate 80 is received in the circular opening 60 in the frame side wall 56. The boss 84 defines a circular opening 86 which extends axially through the bearing plate 80. A main lock pawl opening 88 in the bearing plate 80 is aligned with the main lock pawl opening 68 in the frame side wall 56.

The retractor 10 includes a cylindrical shaft 90 having a full diameter portion 92 and a reduced diameter end portion 94. A flat 96 extends axially along the reduced diameter end portion 94 and along a small portion 98 of the full diameter portion 92 of the shaft 90. The flat 96 gives the shaft end portion 94 a D-shaped cross-sectional configuration as seen in FIG. 2. An axially-extending extending slot 100 is formed in the opposite end portion 102 of the shaft 90.

A spool 110 includes a sleeve 112 and a pair of spool locking ratchet wheels 114 and 116 fixed to opposite axial ends of the sleeve. Each spool locking ratchet wheel 114 and 116 has on its perimeter a plurality of circumferentially spaced ratchet teeth 118. The full diameter portion 92 of the shaft 90 extends through a circular opening (not shown) in the spool locking ratchet wheel 114. The D-shaped portion 98 of the shaft 90 is received in a D-shaped opening 120 in the other spool locking ratchet wheel 116. The spool 110 is thus fixed for rotation with the shaft 90. The seat belt webbing 32 is wound on the sleeve 112 of the spool 110 in a manner not shown.

The slotted end portion 102 of the shaft 90 extends through the opening 58 in the frame side wall 54 and is supported for rotation on the boss 74 of the end plate 70. The opposite end of the shaft 90 extends through the opening 60 in the frame side wall 56 and is supported for rotation on the boss 84 of the bearing plate 80. The spool 110 is rotatable about the spool axis 62 relative to the frame 50 in a belt retraction direction 122 and in an opposite belt withdrawal direction 124. A rewind spring mechanism (not shown) is connected with the shaft 90 through the slot 100 in the shaft end portion 102. The rewind spring mechanism biases the spool 110 for rotation in the belt retraction direction 122.

The retractor 10 includes a carrier or pilot ratchet 130. The pilot ratchet 130 has a radially extending circular disk portion 132. An annular boss 134 on the pilot ratchet 130 projects axially from the disk portion 132 in a direction toward the spool 110. The boss 134 has a cylindrical outer periphery (not shown) and a D-shaped central opening 136. The D-shaped central opening 136 receives the D-shaped end portion 94 of the shaft 90. The pilot ratchet 130 is thus fixed for rotation with the spool 110. A cylindrical wall 138 of the pilot ratchet 130 extends axially from the disk portion 132 in a direction toward the spool 110. A plurality of ratchet teeth 140 are formed in a circular array on the outer periphery of the wall 138 of the pilot ratchet 130.

A main lock pawl actuator 150 is disposed intermediate the bearing plate 80 and the pilot ratchet 130. The main lock pawl actuator 150 has a radially extending circular disk portion 152 with a circular opening 154. The boss 134 of the pilot ratchet 130 extends through the circular opening 154 and supports the actuator 150 for limited rotation about the spool axis 62. The actuator 150 is rotatable about the spool axis 62 between a first or unactuated position as viewed in FIGS. 3A and 3B and a second or actuated position as viewed in FIG. 3C. A return spring 156 acting between a spring support 158 on the actuator 150 and a spring support 160 on the bearing plate 80 biases the actuator into the first or unactuated position as viewed in FIGS. 3A and 3B. The actuator 150 also has a radially extending cam portion 170. A V-shaped cam slot 172 extends through the cam portion 170 of the actuator 150.

A main lock pawl 180 is disposed adjacent to the spool locking ratchet wheels 114 and 116. The main lock pawl 180 is preferably made from metal and includes a locking portion 182 which extends between a pair of arms 184 and 186. The arm 184 is supported on the plastic projection 78 in the opening 66 in the frame side wall 54. The plastic projection 78 minimizes rattling noises which might be caused by metal-to-metal contact between the main lock pawl 180 and the frame side wall 54. The other arm 186 of the main lock pawl 180 is supported in the opening 88 in the bearing plate 80. The main lock pawl 180 is thus supported for pivotal movement about a main lock pawl axis 190 which is spaced from and extends parallel to the spool axis 62. A finger portion 188 of the main lock pawl 180 extends from the support arm 186 and is received in the cam slot 172 in the main lock pawl actuator 150.

A lock lever or pilot pawl 200 has a first end portion 202 which encircles a pin 204 on the actuator cam portion 170. The pilot pawl 200 is supported on the pin 204 for pivotal movement about a pilot pawl axis 206 relative to the actuator 150. The pilot pawl axis 206 is spaced from and extends parallel to both the spool axis 62 and the main lock pawl axis 190.

A second end portion 210 (FIG. 3A) of the pilot pawl 200 projects forward from the pin 204. An upper surface of the second end portion 210 defines a tooth 212 which projects upward in a direction toward the ratchet teeth 140 on the pilot ratchet 130. A lower surface of the second end portion 210 of the pilot pawl 200 is formed as a downwardly projecting axially extending rib 214.

The vehicle deceleration sensing assembly 40 (FIGS. 2, 3A, and 4) includes generally a hanger 220, a first inertia member 222, a second inertia member 224 which includes a plastic shell 226 and a metal weight 228, and a sensor lever 230. The hanger 220 is a plastic member which is connected to the bearing plate 80 and which supports the other components of the vehicle deceleration sensing assembly 40. A pair of support tabs 240 on the hanger 220 are received in corresponding support arms 242 on the bearing plate 80 which project axially away from the spool 110. The engagement of the tabs 240 of the hanger 220 with the support arms 242 of the bearing plate 80 secures the hanger 220 to the bearing plate 80 and thus to the frame 50.

The hanger 220 has an open rectangular configuration and includes parallel inner and outer cross arms 244 and 246 which are joined at their ends by a pair of side arms 248 and 250. An opening 252 in the inner cross arm 244 and an opening 254 in the outer cross arm 246 define between them a gimbal axis 260. The gimbal axis 260 extends parallel to the seat back adjustment axis 30. The gimbal axis 260 preferably, but not necessarily, also extends parallel to the spool axis 62.

Figure 3A:
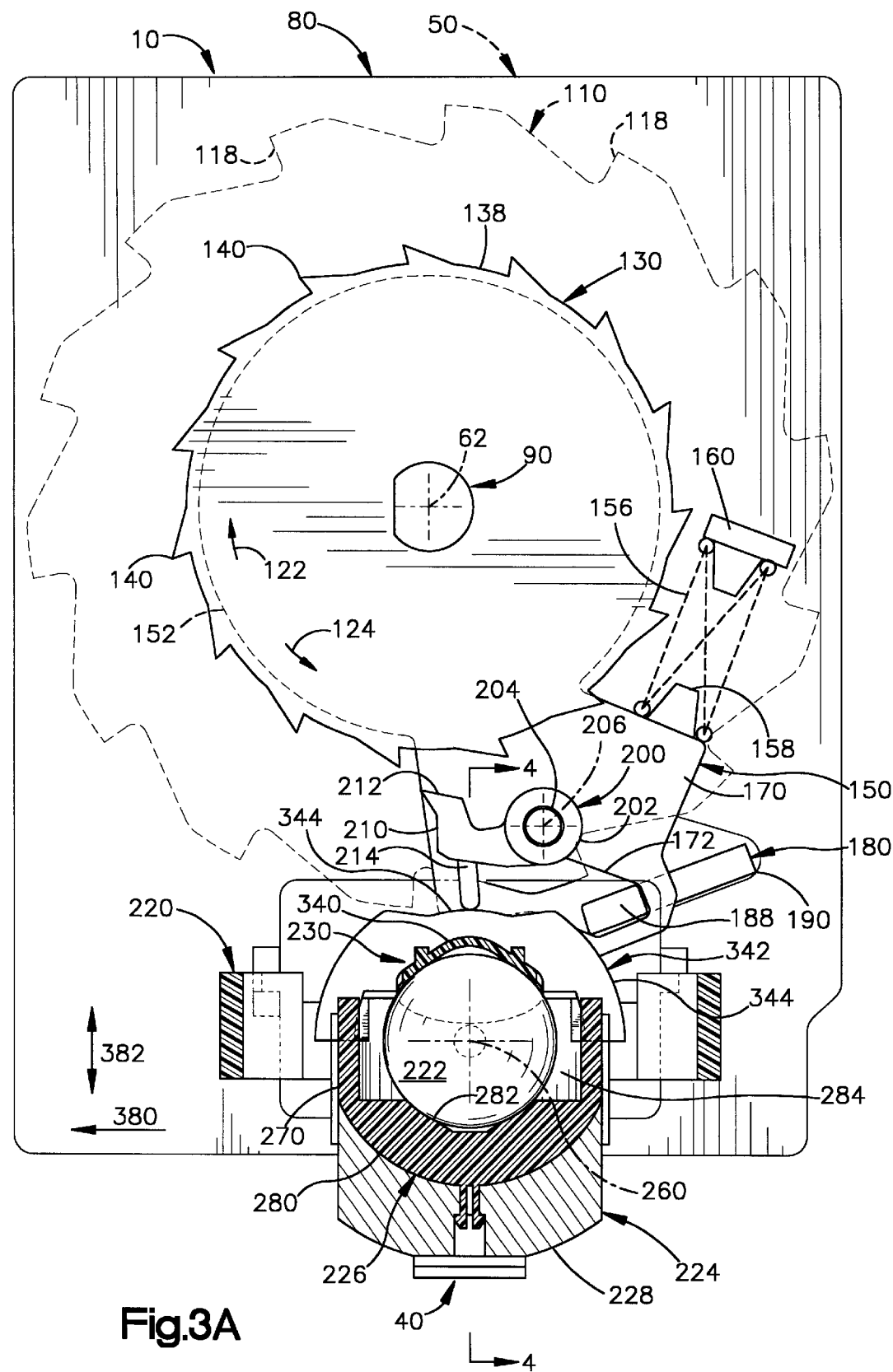
FIG. 3A is a schematic side elevational view of the retractor of FIG. 1 in a first inclined orientation with parts removed and parts in section and with the sensing assembly/ in an unactuated condition.
Figure 4:
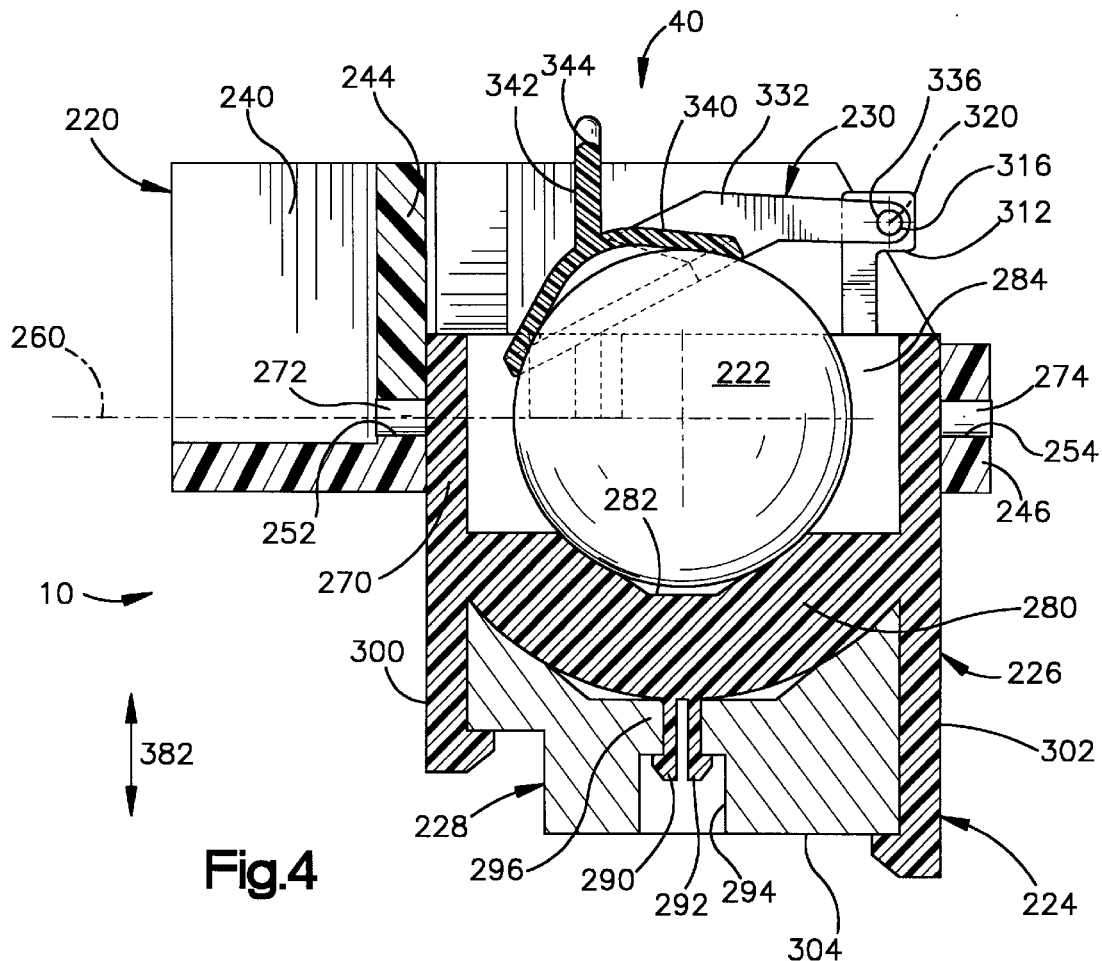
FIG. 4 is a sectional view taken along line 4—4 of FIG. 3A with parts removed.

The plastic shell 226 has a cylindrical wall portion 270 (FIG. 3A). Two pins 272 and 274 project outwardly from the cylindrical wall portion 270 and are received in the openings 252 and 254 of the hanger 220. The pins 272 and 274 support the shell 226 on the hanger 220 for pivotal movement about the gimbal axis 260 relative to the hanger 220.

A bottom wall portion 280 of the shell 226 has a generally frustoconical upwardly facing ramp surface 282. The ramp surface 282 and the cylindrical wall portion 270 of the shell 226 partially define a cavity 284 in the shell. The first inertia member 222, which is preferably a spherical steel ball, is disposed on the ramp surface 282 and in the cavity 284. The center of mass of the first inertia member 222 is disposed above the ramp surface 282.

Two clip arms 290 and 292 (FIG. 4) project downward from the bottom wall portion 280 of the shell 226 and extend through a central opening 294 in the metal weight 228. The clip arms 290 and 292 engage a center portion 296 of the metal weight 228. Another pair of clip arms 300 and 302 extend downward along the outside of the metal weight 228 and engage a lower surface 304 of the metal weight. The clip arms 290, 292, 300 and 302 support the metal weight 228 and connect the metal weight for movement with the shell 226. The center of mass of the second inertia member 224, that is, of the combined shell 226 and weight 228, is disposed below the gimbal axis 260 and below the ramp surface 282.

A pair of sensor lever support posts 310 and 312 (FIGS. 2 and 4) project upward from the cylindrical wall portion 270 of the shell 226. A pair of openings 314 and 316 on the sensor lever support posts 310 and 312 define a sensor lever axis 320. The sensor lever axis 320 extends transverse to the gimbal axis 260.

The sensor lever 230 is made from plastic and has two parallel lever arms 330 and 332. A pivot pin 336 on the one sensor lever arm 332 is received in the opening 316 in the sensor lever support post 312. A pivot pin (not shown) on the other sensor lever arm 330 is received in the opening 314 on the sensor lever support post 310. The sensor lever 230 is thus supported on the shell 226 by the lever arms 330 and 332 for pivotal movement about the sensor lever axis 320 relative to the shell 226.

A cap portion 340 of the sensor lever 230 is disposed above and rests upon the first inertia member 222. An arch portion 342 of the sensor lever 230 projects upward from the cap portion 340 in a direction away from the first inertia member 222. The arch portion 342 has an undulating outer surface 344, described below in detail. The outer surface 344 of the arch portion 342 of the sensor lever 230 engages the underside of the downwardly projecting rib 214 on the pilot pawl 200.

The vehicle seat back 22 (FIG. 1) can be reclined relative to the seat bottom cushion 18, about the seat back adjustment axis 30, to place the retractor 50 in a plurality of different inclined orientations. FIG. 3A shows the retractor 10 in a first one of the plurality of inclined orientations. The parts of the retractor 10 are illustrated in FIG. 3A in a condition with the vehicle 12 moving at a steady speed in a forward direction as indicated by the arrow 380. The first inertia member 222 and the second inertia member 224 are in a predetermined orientation relative to the other parts of the retractor 10. In this predetermined orientation, the center of mass of the first inertia member 222 is disposed vertically above the center of mass of the second inertia member 224, as shown by the vertically extending arrow 382. The first inertia member 222 is centered on the ramp surface 282. The tooth portion 212 of the pilot pawl 200 is spaced from the ratchet teeth 140 on the pilot ratchet 130.

Figure 3B:
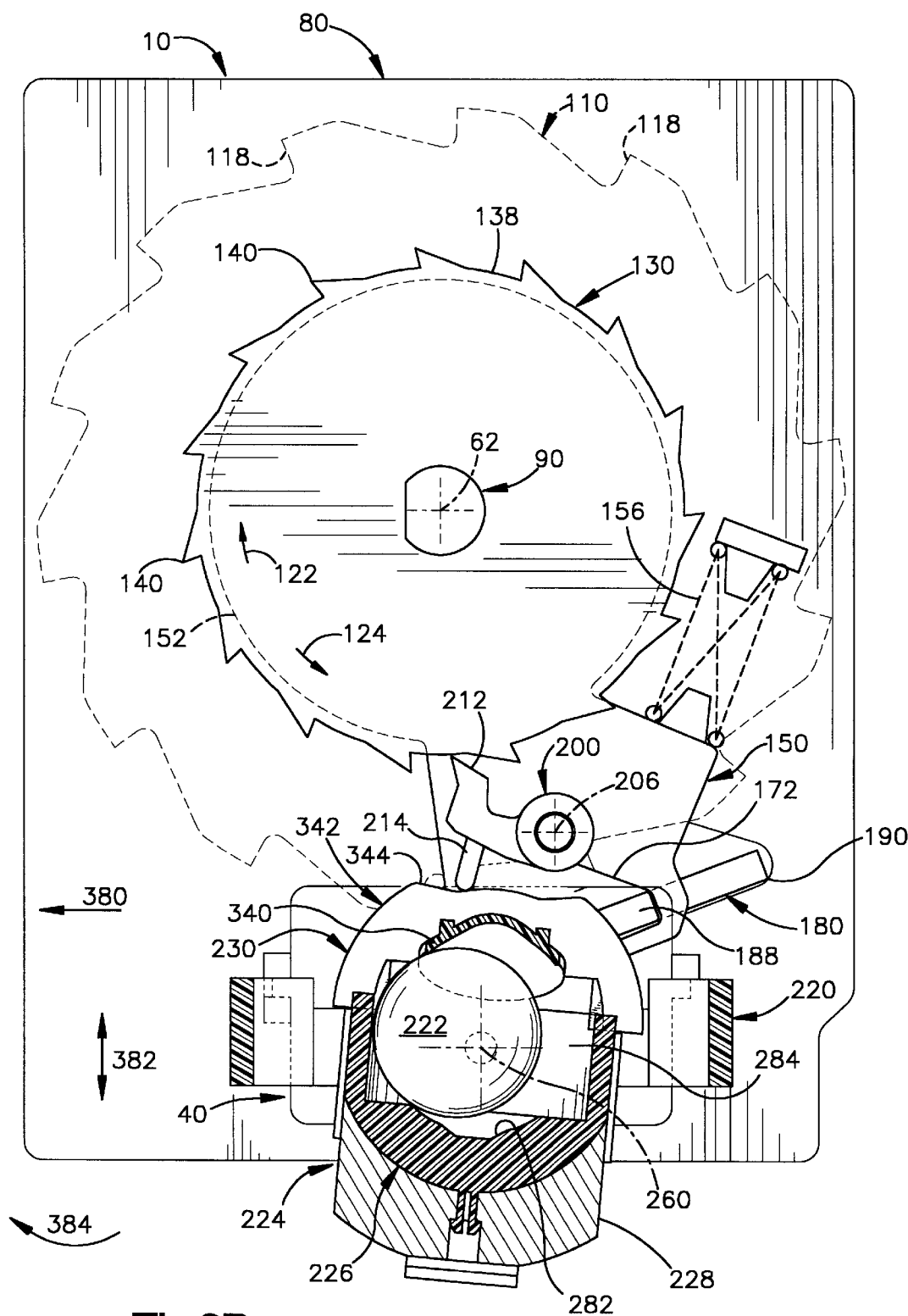
FIG. 3B is a view similar to FIG. 3A but showing the sensing assembly in a partially actuated condition.
Figure 3C:
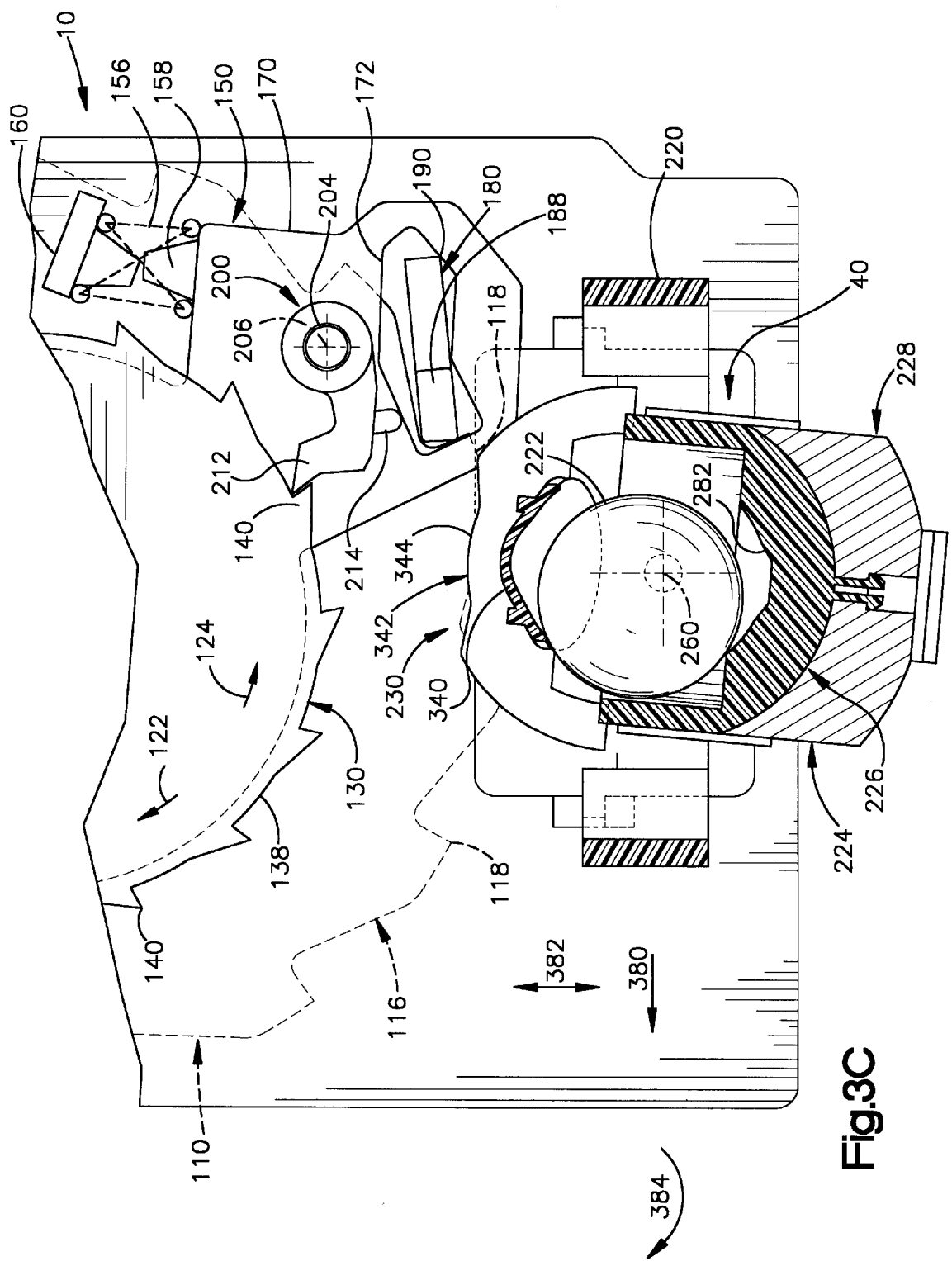
FIG. 3C is a view similar to FIG. 3B showing the sensing assembly in a fully actuated condition.

In the event of sudden vehicle deceleration such as occurs in a vehicle collision, the parts of the retractor 10 which are supported for pivotal movement about the gimbal axis 260 continue to move forward relative to the other parts of the retractor 10, which decelerate. The parts that continue to move forward include the first and second inertia members 222 and 224. Because the center of mass of the second inertia member 224 is disposed below the gimbal axis 260, the second inertia member swings forward and upward, pivoting about the gimbal axis 260, in a direction as indicated by the arrow 384 (FIG. 3B). At the same time, the first inertia member 222 rolls forward and upward along the ramp surface 282 of the shell 226 of the second inertia member 224.

The first inertia member 222 exerts an upwardly directed force on the sensor lever 230. The sensor lever 230 pivots upward about the sensor lever axis 320. The arch portion 342 of the sensor lever 230 exerts an upwardly directed force on the rib 214 of the pilot pawl 200. The pilot pawl 200 pivots upward about the pilot pawl axis 206. The tooth 212 of the pilot pawl 200 moves into the path of revolution of the pilot ratchet teeth 140.

Should the occupant of the seat 16 move forward relative to the seat back 22 as a result of the sudden vehicle deceleration, the occupant engages the belt webbing 32. Forward movement of the occupant then results in withdrawal of belt webbing from the retractor 10. The retractor spool 110 rotates in the belt withdrawal direction 124. The pilot ratchet 130 is fixed for rotation with the spool 110 and also rotates in the belt withdrawal direction 124.

The pilot pawl tooth 212, which is disposed in the path of revolution of the pilot ratchet teeth 140, is engaged by one of the moving ratchet teeth. The pilot pawl 200 transmits the rotational force of the pilot ratchet 130 into the main lock pawl actuator 150. The main lock pawl actuator 150 rotates about the spool axis 62. The surfaces defining the cam slot 172 in the actuator 150 move relative to the finger portion 188 of the main lock pawl 180. The main lock pawl 180 is thereby cammed upward about the main lock pawl axis 190 from the disengaged position shown in FIGS. 3A and 3B to the engaged position shown in FIG. 3C in engagement with the ratchet teeth 118 on the spool locking ratchet wheels 114 and 116. The engagement of the main lock pawl 180 with the ratchet teeth 118 blocks rotation of the spool 110 in the belt withdrawal direction 124. This blocks further withdrawal of belt webbing 32 from the retractor 10 to restrain the vehicle occupant.

Figure 5:
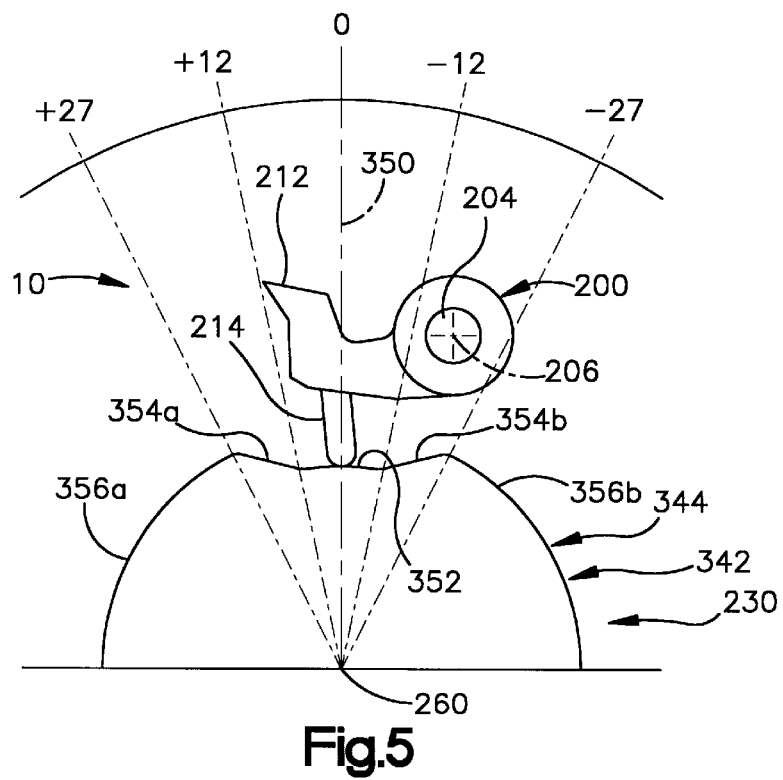
FIG. 5 is an enlarged fragmentary view of a sensor lever which forms part of the retractor of FIG. 1.

The configuration of the outer surface 344 of the arch portion 342 of the sensor lever 230, best seen in FIG. 5, is selected to provide automatic locking (tilt locking) of the retractor 10 when the seat back 22 is tilted to a position more than 27 degrees from the installed position of the seat back. In the illustrated embodiment, the installed position of the seat back 22 is indicated by the centerline 350. The centerline 350 is illustrated as extending vertically when the seat back 22 is in the installed position shown in FIG. 7A.

The outer surface 344 of the arch portion 342 of the sensor lever 230 (FIG. 5) has a first or central portion 352 on which the pawl rib 214 rests when the seat back 22 is tilted to a position 12 degrees or less from the installed position. The central portion 352 of the outer surface 344 extends 12 degrees on either side of the centerline 350 of the arch portion 342.

The central portion 352 of the outer surface 344 is configured as an arc of a circle which is centered on the gimbal axis 260 when the sensing assembly 40 is in the unactuated condition. The radial distance between the gimbal axis 260 and the arcuate surface 352 is selected so that when the pawl rib 214 is on the arcuate surface 352, the tooth 212 of the pilot pawl 200 is not in the path of revolution of the pilot ratchet teeth 140.

The outer surface 344 of the arch portion 342 of the sensor lever 230 has a second section which includes two portions designated 354a and 354b. The surface portions 354a and 354b are located circumferentially on opposite sides of the arcuate central portion 352 of the outer surface 344 of the arch portion 342.

The pawl rib 214 rests on the surface portion 354a when the seat back 22 is tilted forward by more than 12 degrees but less than or equal to 27 degrees from the installed position. The pawl rib 214 rests on the surface portion 354b when the seat back 22 is tilted rearward by more than 12 degrees but less than or equal to 27 degrees from the installed position.

The surface portions 354a and 354b are configured as ramps which extend radially outward from the central portion 352 and from the gimbal axis 260 as they extend in a direction away from the central portion. Specifically, the radial distance between the gimbal axis 260 and the surface portion 354a increases as measured at successive points taken from right to left (as viewed in FIG. 7) along the surface portion 354a. Similarly, the radial distance between the gimbal axis 260 and the surface portion 354b increases as measured at successive points taken from left to right (as viewed in FIG. 7) along the surface portion 354b. The radial distance between the gimbal axis and the surface portions 354a and 354b is selected so that when the pawl rib is located anywhere on either one of the surface portions 354a or 354b, the tooth 212 of the pilot pawl 200 is not in the path of revolution of the pilot ratchet teeth 140.

The outer surface 344 of the arch portion 342 of the sensor lever 230 has a third section which includes two surface portions 356a and 356b. The surface portions 356a and 356b are located circumferentially outward of the ramp surface portions 354a and 354b, respectively.

The pawl rib 214 rests on the surface portion 356a when the seat back 22 is tilted forward more than 27 degrees from the installed position. The pawl rib rests on the surface portion 356b when the seat back 22 is tilted rearward by 27 degrees or more from the installed position. The radial distance between the gimbal axis 260 and the surface portions 356a and 356b is great enough that when the pawl rib 214 is located anywhere on either one of the surface portions 356a or 356b, the tooth 212 of the pilot pawl 200 is disposed in the path of revolution of the pilot ratchet teeth 140.

When the seat back 22 is tilted or pivoted about the seat back adjustment axis 30, the retractor frame 50 and the hanger 220 tilt also. The second inertia member 224, which is supported on the hanger 220 for pivotal movement about the gimbal axis 230, maintains its predetermined orientation as shown in FIGS. 1A and 1B and 6A–6C. The sensor lever 230 is supported on the second inertia member 224 for movement with the second inertia member about the gimbal axis 260. Thus, the sensor lever 230 maintains the same predetermined orientation as the second inertia member 224.

Also, the first inertia member 222 does not move relative to the second inertia member 224 as a result of tilting movement of the seat back 22. The first inertia member 222 remains in the centered (unactuated) position shown in FIG. 3A. Thus, the first inertia member 222 does not move the sensor lever 230 and the sensor lever does not move the pilot pawl 200 as a result of tilting of the seat back 22.

The pilot pawl 200, however, does move relative to the sensor lever 230 when the seat back 22 is tilted because of the non-arcuate configuration of the outer surface 344 of the arch portion of the sensor lever. Specifically, the pilot pawl 200 is supported on the main lock pawl actuator 150, which is supported on the retractor shaft 90. When the seat back 22 is tilted about the axis 30, the retractor shaft 90 and the main lock pawl actuator 150 move with the seat back, causing the pilot pawl 200 to move in an arcuate path centered on the seat back adjustment axis 30. This movement of the pilot pawl 200 occurs relative to the sensor lever 230, and is manifested as sliding movement of the pilot pawl rib 214 along the outer surface 344 of the arch portion 342 of the sensor lever 230.

Figure 6A:
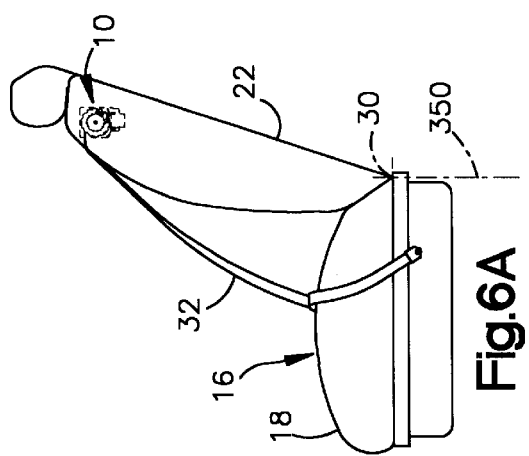
FIGS. 6A–6C are a series of views showing the seat back at three different reclined positions.
Figure 6B:
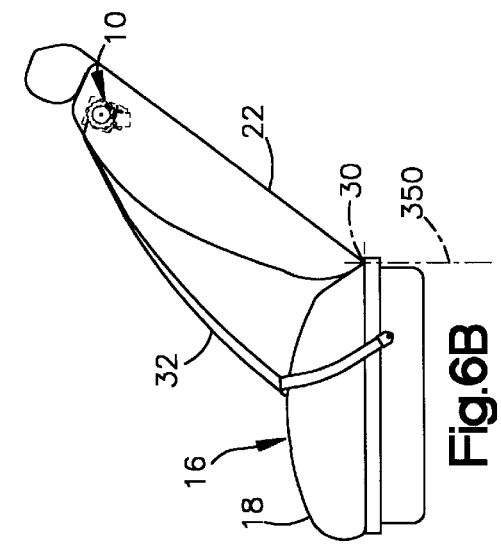
Figure 6C:
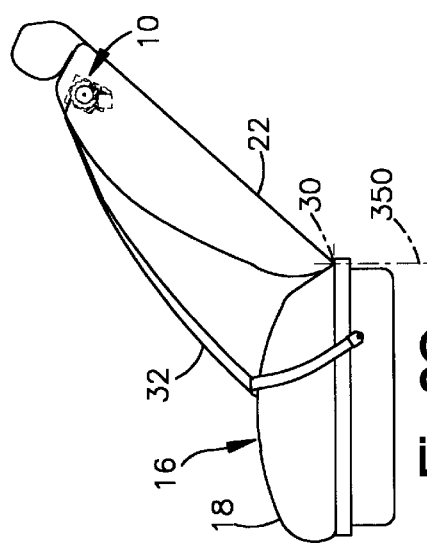
Figure 7A:
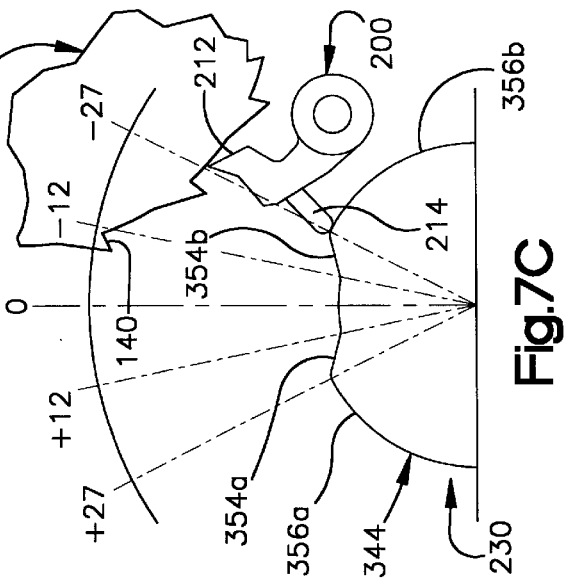
FIGS. 7A–7C are a series of schematic views showing the relative positions of the sensor lever of FIG. 5 and an associated lock lever when the seat back is in the respective positions shown in FIGS. 6A–6C.
Figure 7B:
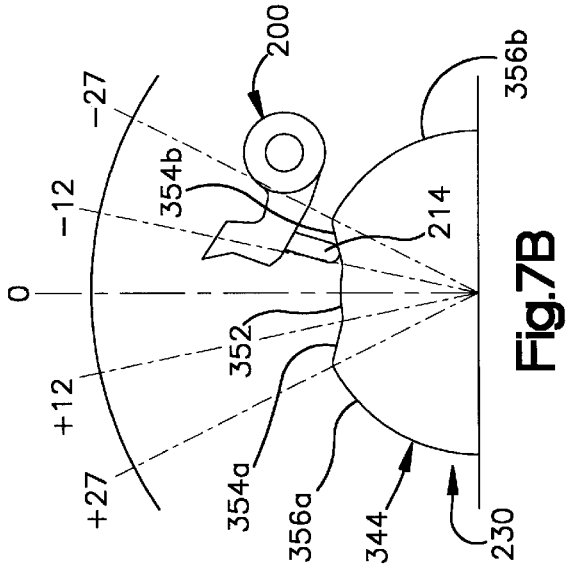
Figure 7C:
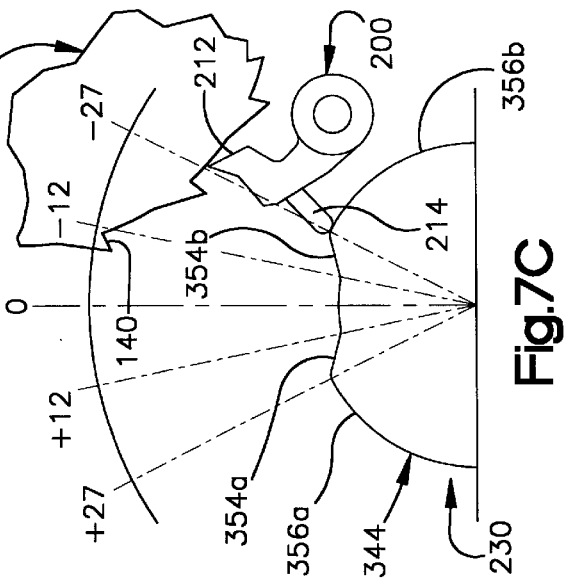

When the seat back 22 is tilted forward or rearward about the seat back adjustment axis 30 to a position within a range less than or equal to 12 degrees on either side of the installed position, the pilot pawl rib 214 remains on the central portion 352 of the outer surface 344 of the arch portion 342 of the sensor lever 230. Such a position of the seat back 22 and the pilot pawl 200 is illustrated in FIGS. 6A and 7A. In this case, the pilot pawl 200 does not move closer to the pilot ratchet 130 and the tooth 212 on the pilot pawl remains out of the path of revolution of the pilot ratchet teeth 140. The retractor 10 does not lock.

If the seat back 22 is tilted to a position more than 12 degrees but less than or equal to 27 degrees forward of the installed position, then the pilot pawl rib 214 moves to a position on the surface portion 354a of the outer surface 344 of the sensor lever 230. Because of the ramp configuration of the surface portion 354a, the pilot pawl tooth 212 moves closer to the path of revolution of the pilot ratchet teeth 140. The pilot pawl tooth 212, however, remains out of the path of revolution of the pilot ratchet teeth 140. The retractor 10 is not locked.

Similarly, if the seat back 22 is tilted to a position more than 12 degrees but less than or equal to 27 degrees rearward of the installed position, then the pilot pawl rib 214 moves to a position on the surface portion 354b of the outer surface 344 of the sensor lever 230. Because of the ramp configuration of the surface portion 354b, the pilot pawl tooth 212 moves closer to the path of revolution of the pilot ratchet teeth 140. The pilot pawl tooth 212 still, however, remains out of the path of revolution of the pilot ratchet teeth 140. The retractor 10 is not locked.

If the seat back 22 is tilted forward to a position more than 27 degrees forward of the installed position, then the pilot pawl rib 214 moves to a position on the surface portion 356a of the sensor lever 230. In this condition, the pilot pawl tooth 212 is in the path of revolution of the pilot ratchet teeth 140. Similarly, if the seat back 22 is tilted rearward to a position more than 27 degrees rearward of the installed position, then the pilot pawl rib 214 moves to a position on the surface portion 356b of the sensor lever 230. In this condition, the pilot pawl tooth 212 is in the path of revolution of the pilot ratchet teeth 140.

Should the occupant of the seat 16 move forward relative to the seat back 22 when the pilot pawl tooth 212 is in the path of revolution of the pilot ratchet teeth 140, the occupant engages the belt webbing 32. Forward movement of the occupant then results in withdrawal of a small amount of belt webbing from the retractor 10. The retractor spool 110 rotates in the belt withdrawal direction 124. The pilot ratchet 130 is fixed for rotation with the spool 110 and also rotates in the belt withdrawal direction 124.

The pilot pawl tooth 212, which is disposed in the path of revolution of the pilot ratchet teeth 140, is engaged by one of the moving ratchet teeth. The pilot pawl 200 transmits the rotational force of the pilot ratchet 130 into the main lock pawl actuator 150. The main lock pawl actuator 150 rotates about the spool axis 62. The surfaces defining the cam slot 172 in the actuator 150 move relative to the finger portion 188 of the main lock pawl 180. The main lock pawl 180 is cammed upward about the main lock pawl axis 190 from the disengaged position shown in FIGS. 3A and 3B to the engaged position shown in FIG. 3C in engagement with the ratchet teeth 118 on the spool locking ratchet wheels 114 and 116. The engagement of the main lock pawl 180 with the ratchet teeth 118 blocks rotation of the spool 110 in the belt withdrawal direction 124. This blocks further withdrawal of belt webbing 32 from the retractor 10 to restrain the vehicle occupant.

It can thus be seen that tilting of the vehicle seat back 22 to a position more than 27 degrees from the installed position places the retractor 10 in an automatic locking (tilt locking) mode. In this automatic locking mode, forward movement of the vehicle occupant relative to the seat back 22 is restrained by the retractor 10, regardless of whether the vehicle is experiencing sudden deceleration in excess of the predetermined amount. On the other hand, tilting of the seat back 22 to a position 12 degrees or less away from the installed position does not place the retractor 10 in an automatic locking (tilt locking) mode.

When the vehicle seat back 22 is pivoted forward or rearward about the seat back adjustment axis 30 to a second inclined orientation different from the first inclined orientation illustrated in FIGS. 3A–3C, the operation of the vehicle deceleration sensing assembly 40 is generally the same as described above with reference to FIGS. 3A–3C. This similarity results because the first inertia member 222 and the second inertia member 224 are together supported for pivotal movement on the gimbal axis 260, which extends parallel to the seat back adjustment axis 30. As a result, the inertia members 222 and 224 remain in their single predetermined orientation, identical to that shown in FIG. 3A, in which the center of mass of the first inertia member 222 is vertically above the center of mass of the second inertia member 224. Therefore, in the event of sudden vehicle deceleration such as occurs in a vehicle collision, the inertia members 222 and 224, the sensor lever 230, the pilot pawl 200, and the pilot ratchet 130 cooperate to initiate lockup of the retractor spool 110, in the manner described above. This blocks rotation of the spool 110 in the belt withdrawal direction 124, thus restraining the vehicle occupant. This operation of the deceleration sensing assembly at different inclined orientations of the vehicle seat back 22 is discussed in more detail in the above-mentioned U.S. Pat. No. 5,495,994.

When the retractor 10 in this manner assumes such a different inclined orientation, the inertia members 222 and 224, as well as the sensor lever 230, assume a different position relative to the other parts of the retractor 10 which are not supported for swinging movement about the gimbal axis 260. Specifically, the outer surface 344 on the arch portion 342 of the sensor lever 230 slides along the downwardly projecting rib 214 on the pilot pawl 200 as the retractor 10 moves between the different inclined orientations.

The inertia member 222, however, remains in the center of the inertia member 224, because there are no stops to limit the gimbaled (swinging) movement of the inertia member 224. Further, the arcuate configuration of the central portion 352 of the outer surface 344 of the sensor lever 230 maintains the pilot pawl 200 the same distance out of the path of revolution of the pilot ratchet teeth 140. As a result, the vehicle deceleration sensing assembly 40 does not lock up more quickly when the seat back 22 is tilted a position within 12 degrees on either side of the installed position. Thus, for a large percentage of the overall adjustment range of the seat back 22, the retractor 10 will not undesirably lock upon relatively small vehicle movements.

From the above description of the invention, those skilled in the art will perceive improvements, changes and modifications in the invention. Such improvements, changes and modifications within the skill of the art are intended to be covered by the appended claims.

Having described the invention, we claim:

1. A seat belt webbing retractor for mounting on a vehicle seat back, said retractor comprising:

a spool on which seat belt webbing is wound, said spool being supported for rotation about an axis in a belt retraction direction and in an opposite belt withdrawal direction; and inertia sensing means for blocking rotation of said spool in the belt withdrawal direction in response to vehicle deceleration above a predetermined deceleration;

said inertia sensing means comprising a first inertia member movable from an unactuated position to an actuated position in response to vehicle deceleration above a predetermined deceleration, and sensor means operable to block rotation of said spool in the belt withdrawal direction in response to movement of said first inertia member from the unactuated position to the actuated position;

said sensor means being operable to block rotation of said spool in the belt withdrawal direction in response to tilting of the vehicle seat back by an amount more than a predetermined amount when said first inertia member is in the unactuated position.

2. A retractor as set forth in claim 1 wherein said inertia sensing means further comprises support means for supporting said first inertia member in the unactuated position when the seat back is tilted by any amount less than the predetermined amount, said first inertia member being movable relative to said support means from the unactuated position to the actuated position, said support means and said first inertia member having the same predetermined orientation when the seat back is tilted by any amount less than the predetermined amount.

3. A retractor as set forth in claim 2 wherein said support means comprises a second inertia member which is supported on the seat back for pivotal movement relative to the seat back to maintain said predetermined orientation of said first inertia member and of said support means when the seat back is tilted by any amount less than the predetermined amount.

4. A retractor as set forth in claim 2 wherein said inertia sensing means further comprises a ratchet rotatable about said axis and a pawl supported for pivotal movement about a second axis between a disengaged position and an engaged position in engagement with said ratchet;

said sensor means moving said pawl from the disengaged position to the engaged position in response to movement of said first inertia member relative to said support means from the unactuated position to the actuated position.

5. A retractor as set forth in claim 4 wherein said sensor means comprises a sensor lever having a first surface in engagement with said first inertia member and a second surface in engagement with said pawl, said sensor lever second surface including first and second sections on which said pawl is supported when the seat back is tilted by an amount less than the predetermined amount and a third section on which said pawl is supported when the seat back is tilted by an amount equal to or greater than the predetermined amount, said pawl being in the engaged position when on said third section of said sensor lever second surface.

6. A retractor as set forth in claim 1 wherein said sensor means comprises a sensor lever having a first surface in engagement with said first inertia member and a second surface, said sensor means further comprising a lock lever in engagement with said second surface of said sensor lever, said sensor lever second surface including first and second sections on which said lock lever is supported when the seat back is tilted by an amount less than the predetermined amount and a third section on which said pawl is supported when the seat back is tilted by an amount equal to or greater than the predetermined amount.

7. A retractor as set forth in claim 6 wherein said first section of said sensor lever second surface has an arcuate configuration centered on an axis of pivotal movement of said sensor lever extending parallel to the axis of tilting of the vehicle seat back, and said second section of said sensor lever second surface has a ramp configuration extending between said first section and said third second section.

8. A seat belt webbing retractor for mounting on a vehicle seat back, said retractor comprising:

a spool on which seat belt webbing is wound, said spool being supported for rotation about an axis in a belt retraction direction and in an opposite belt withdrawal direction; and tilt locking means for blocking rotation of said spool in the belt withdrawal direction in response to tilting of the vehicle seat back above a predetermined amount, said tilt locking means comprising a gimbaled inertia assembly which maintains a predetermined orientation when the seat back is tilted at any amount below the predetermined amount.

9. A retractor as set forth in claim 8 comprising means for supporting said inertia assembly for pivotal movement relative to the seat back about an axis extending parallel to the axis of tilting of the seat back.

10. A retractor as set forth in claim 9 wherein said inertia assembly comprises a first inertia member supported on a second inertia member for movement relative to said second inertia member in response to vehicle deceleration above a predetermined deceleration.

11. A retractor as set forth in claim 10 wherein said inertia assembly further comprises a sensor lever movable in response to movement of said first inertia member relative to said second inertia member, a ratchet, and a lock lever movable by said sensor lever into engagement with said ratchet when the seat back is tilted by an amount equal to or greater than the predetermined amount.

12. A retractor as set forth in claim 11 wherein said sensor lever has an undulating surface which is engaged by said lock lever to effect movement of said lock lever toward said ratchet in response to tilting of the seat back toward a position in which the seat back is tilted by an amount equal to or greater than the predetermined amount.

* * * * *